(12) United States Patent
Koo et al.

(10) Patent No.: US 7,880,453 B2
(45) Date of Patent: Feb. 1, 2011

(54) INTERLEAVED SWITCHING CONVERTER, AND SWITCHING CONTROLLER AND CONTROLLING METHOD THEREOF

(75) Inventors: Gwan-Bon Koo, Bucheon (KR); Young-Bae Park, Anyang (KR); Hang-Seok Choi, Gunpo (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 278 days.

(21) Appl. No.: 12/257,774

(22) Filed: Oct. 24, 2008

(65) Prior Publication Data

US 2009/0206809 A1 Aug. 20, 2009

(30) Foreign Application Priority Data

Feb. 14, 2008 (KR) ............... 10-2008-0013646

(51) Int. Cl.
*G05F 1/575* (2006.01)
*G05F 1/613* (2006.01)

(52) U.S. Cl. ............ 323/283; 323/225; 323/272; 323/288

(58) Field of Classification Search ........ 323/222, 323/225, 271, 272, 282, 283, 288, 350
See application file for complete search history.

(56) References Cited

U.S. PATENT DOCUMENTS

| | | | |
|---|---|---|---|
| 5,905,369 A | 5/1999 | Ishii et al. | |
| 6,091,233 A | 7/2000 | Hwang et al. | |
| 6,495,995 B2 * | 12/2002 | Groom et al. | 323/283 |
| 6,690,589 B2 | 2/2004 | Barnett et al. | |
| 6,894,464 B2 * | 5/2005 | Zhang | 323/268 |
| 6,977,489 B2 * | 12/2005 | Isham | 323/272 |
| 7,098,728 B1 * | 8/2006 | Mei et al. | 327/538 |
| 7,570,036 B2 * | 8/2009 | Tang et al. | 323/283 |

OTHER PUBLICATIONS

Brian T. Irving, et al., "A Comparative Study of Soft-Switched CCM Boost Rectifiers and Interleaved Variable-Frequency DCM Boost Rectifier," 7 pages, Research Triangle Park, North Carolina.
Takuya Ishii et al., "Power Factor Correction Using Interleaving Technique for Critical Mode Switching Converters," IEEE, 1998, pp. 905-910, Osaka, Japan.
M. A. P. Andrade et al. "Generalized Switching Logic Scheme for CCM-PFC Interleaved Boost Converters," 35th Annual IEEE Power Electronics Specialists Conference, 2004, pp. 2353-2359, Aachen, Germany.
José R. Pinheiro et al., "Control Strategy of an Interleaved Boost Power Factor Correction Converter," IEEE, 1999, pp. 137-142, Santa Maria, Brazil.

* cited by examiner

*Primary Examiner*—Gary L Laxton
(74) *Attorney, Agent, or Firm*—Sidley Austin LLP (57) ABSTRACT

In an interleaved switching converter, a first converter including a first switch is coupled to a second converter including a second switch. A switching controller for controlling the first switch and the second switch outputs a second control signal for operating the second switch based a first control signal for operating the first switch. A phase shift between the first control signal and the second control signal is 180 degrees.

22 Claims, 9 Drawing Sheets

INTERLEAVED SWITCHING CONVERTER, AND SWITCHING CONTROLLER AND CONTROLLING METHOD THEREOF

CROSS-REFERENCE TO RELATED APPLICATION

This application claims priority to and the benefit of Korean Patent Application No. 10-2008-0013646 filed in the Korean Intellectual Property Office on Feb. 14, 2008, the entire contents of which are incorporated herein by reference.

BACKGROUND

1. Field

The field relates to an interleaved switching converter, and a switching controller and a controlling method thereof.

2. Description of the Related Art

An interleaved switching converter may include a plurality of converters coupled in parallel. Each converter may include a switch, the switches of the converters being sequentially turned on/off. An interleaved switching converter may include N converters, turning on/off the switch of each converter with a phase shift of 360/N degrees. The interleaved switching converter can be also used to a power factor correction circuit that increases a power factor by setting a phase of a voltage to be the same as a phase of a current.

For example, in the case of N equal 2, a switching controller of the interleaved switching converter can output a control signal for turning on a switch of the second converter at a middle point of a switching cycle of a control signal for operating a switch of the first converter. However, it may be difficult for the switching controller to detect a time for outputting the control signal of the second converter when the cycle of the control signal of the first converter is changed.

SUMMARY

Briefly and generally, an implementation of an interleaved switching converter can output a control signal to a switch of each converter with an accurate phase shift.

In an implementation, a switching controller of an interleaved switching converter is provided. The interleaved switching converter includes a first converter that uses a first switch operated by a first control signal, and a second converter that is coupled to the first converter in parallel and uses a second switch operated by a second control signal. The switching controller includes a third switch, a capacitor, an amplifier, a comparator, and a fourth switch. The third switch is coupled between a first voltage source and a node, and is turned on in response to a first pulse signal corresponding to the first control signal. The capacitor is coupled to the node. The amplifier outputs a current corresponding to a difference between a reference voltage and a voltage corresponding to a voltage of the capacitor. The comparator compares an output voltage corresponding to the current output from the amplifier with the voltage of the capacitor, and outputs a second pulse signal according to the comparison. The fourth switch is coupled between the node and a second voltage source, and is turned on by a third pulse signal. The third pulse signal is generated by the second pulse signal and determines a leading edge of the second control signal.

The capacitor may be charged when the third switch is turned on, and may be discharged when the fourth switch is turned on.

The voltage corresponding to the voltage of the capacitor may increase as the voltage of the capacitor at a turn-on time of the third switch increases.

In an implementation, an interleaved switching converter is provided. The interleaved switching converter includes a first converter, a second converter, and a switching controller. The first converter includes a first switch operated in response to a first control signal, and generates a first output voltage corresponding to an input voltage by using the first switch. The second converter is coupled to the first converter in parallel, includes a second switch operated in response to a second control signal, and generates a second output voltage corresponding to the input voltage by using the second switch. The switching controller determines a leading edge of the second control signal based on the first control signal, and includes a capacitor, an amplifier, a comparator, and a pulse generator. The capacitor is charged in response to a first pulse signal corresponding to the first control signal, and is discharged in response to a second pulse signal. The amplifier outputs a current corresponding to a difference between a reference voltage and a voltage corresponding to a voltage of the capacitor. The comparator compares an output voltage corresponding to the current output from the amplifier with the voltage of the capacitor, and outputs a third pulse signal according to the comparison. The pulse generator determines a leading edge of the second pulse signal based on the third pulse signal. The leading edge of the second control signal is determined by the leading edge of the second pulse signal.

In an implementation, a method of controlling an interleaved switching converter is provided. The interleaved switching converter includes a first converter and a second converter coupled to the first converter in parallel. The first converter includes a first switch operated by a first control signal, and the second converter includes a second switch operated by a second control signal. The method includes generating a first pulse signal in accordance with a leading edge of the first control signal, charging a capacitor in response to the first pulse signal, generating a second pulse signal based on a voltage of the capacitor, generating a third pulse signal in accordance with a leading edge of the second pulse signal, discharging the capacitor in response to the third pulse signal, and determining a leading edge of the second control signal in accordance with a leading edge of the third pulse signal.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

Figure 1:
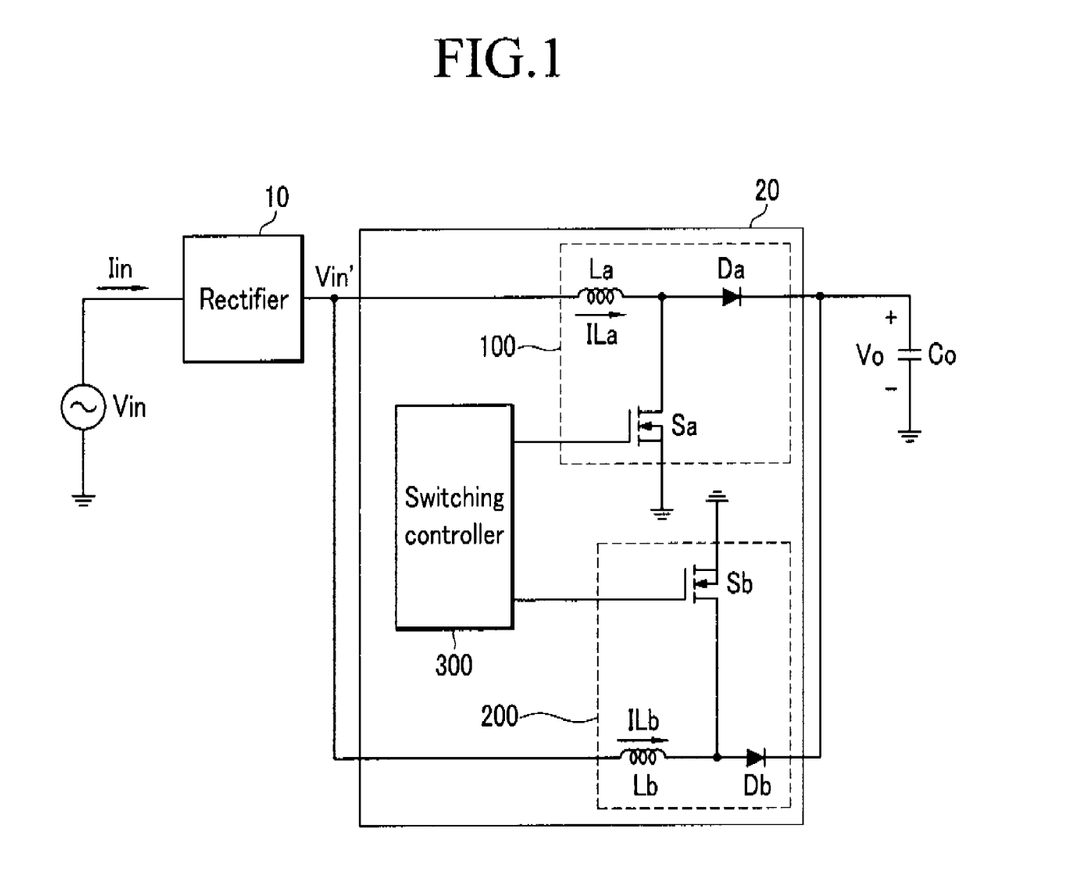
FIG. 1 shows a power factor correction circuit including an interleaved switching converter.
Figure 2:
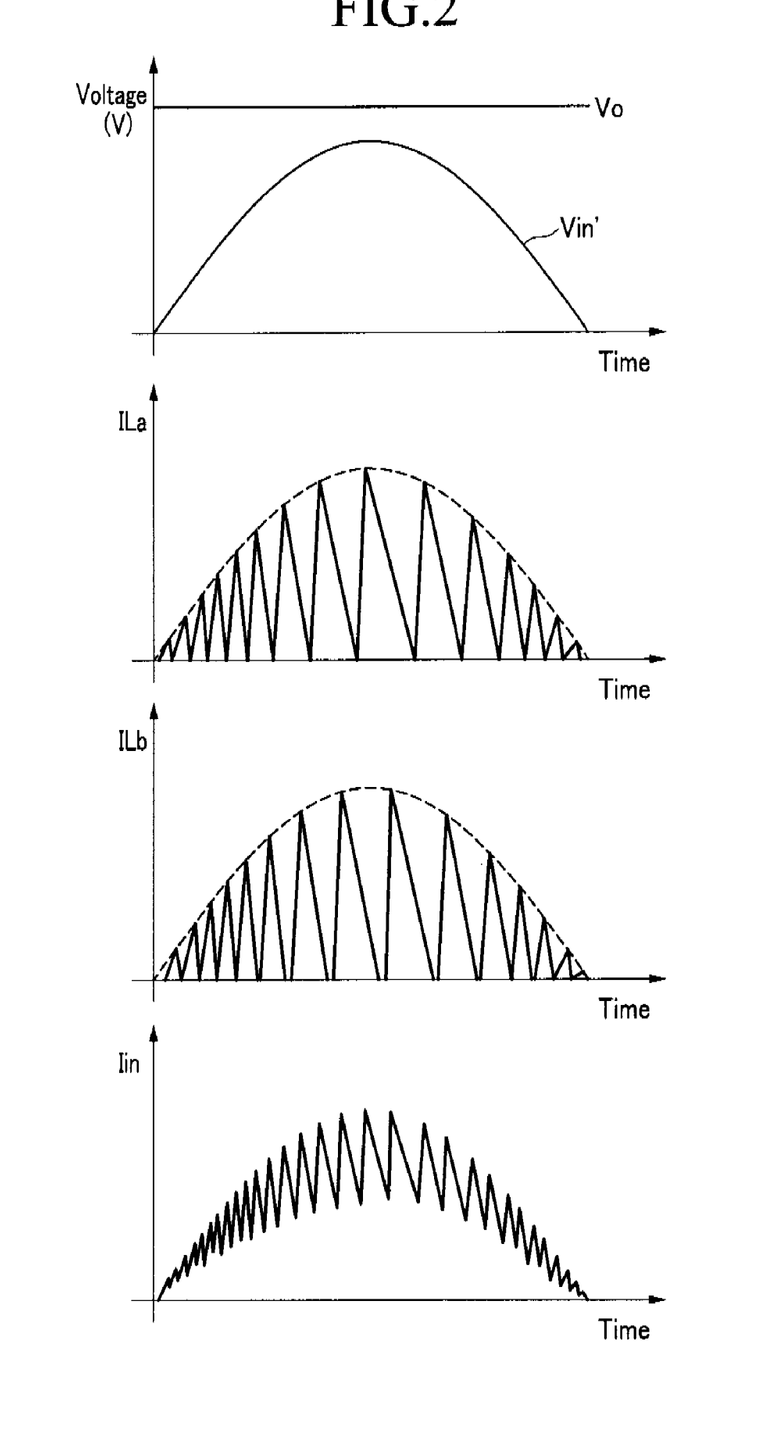
FIG. 2 shows signal waveforms of a converter shown in FIG. 1.

FIG. 1 shows a power factor correction circuit including a rectifier 10, an interleaved switching converter 20 and a capacitor Co. FIG. 2 shows signal waveforms of a converter shown in FIG. 1.

The rectifier 10 can rectify, for example with the full-wave technique, an input voltage Vin from an alternating current (AC) power source, and supply the rectified input voltage Vin' to the interleaved switching converter 20. The rectifier 10 may include a bridge diode.

The interleaved switching converter 20 may include converters 100 and 200, and a switching controller 300. In other implementations, the interleaved switching converter 20 can have more than two converters.

The converters 100 and 200 can be coupled in parallel between the rectifier 10 and the capacitor Co. The converters 100/200 can operate a switch, for example a transistor, in response to control signals CS1 or CS2 from the switching controller 300, thereby generating an output voltage Vo from the rectified input voltage Vin'. The converters 100/200 may include a buck converter, a boost converter, or a buck boost converter. FIG. 1 illustrates an implementation which includes a boost converter in the converters 100/200.

The converters 100/200 may include inductors La/Lb, transistors Sa/Sb, and diodes Da/Db. The inductors La/Lb and diodes Da/Db can be coupled in series between the rectifier 10 and the capacitor Co. The transistors Sa/Sb can have a drain coupled to a junction node between the inductors La/Lb and diodes Da/Db, a source coupled to a ground terminal, and a gate receiving the control signals CS1/CS2 of the switching controller 300. The transistors Sa/Sb can be turned on/off in response to the control signals CS1/CS2.

FIG. 2 illustrates that, when the transistors Sa/Sb are turned on, the rectified input voltage Vin' can be applied to the inductors La/Lb. Then, a current ILa/ILb flowing to the inductors La/Lb is increased with a slope that is proportional to a voltage between two terminals of the inductors La/Lb. When the transistors Sa/Sb are turned off, the currents ILa/ILb of the inductors La/Lb are transmitted to the capacitor Co via the diodes Da/Db. Then, the currents ILa/ILb of the inductors La/Lb can be decreased, and the capacitor Co charged. Since the phase shift between the current ILa and the current ILb is approximately 180 degrees, a sum of the currents ILa and ILb corresponds to a current Iin of the rectifier 10. In some implementations converter 100 is operated as a master converter in a critical conduction mode (CRM), and converter 200 is operated as a slave converter in CRM or in a discontinuous conduction mode (DCM).

The converters 100/200 can generate the output voltage Vo to be higher than the rectified input voltage Vin' by repeating an operation of turning on and turning off the transistors Sa/Sb. In one embodiment, the transistors Sa and Sb are n-channel metal oxide semiconductor (NMOS) transistors. Alternatively, other switches may be used instead of the NMOS transistors.

The switching controller 300 can output control signals CS1 and CS2 to the gates of the transistors Sa and Sb of the converters 100 and 200. The switching controller 300 may include pulse width modulation (PWM) controllers (not shown). Each PWM controller can determine a duty ratio of the transistors Sa/Sb of the converters 100/200, and output the control signals CS1/CS2 according to the duty ratio of the transistors Sa/Sb. The switching controller 300 can determine a leading edge, of the control signal CS2 by using the control signal CS1 such that the phase shift between the control signal CS1 and the control signal CS2 can be approximately 180 degrees. A leading edge of a signal corresponds to a start point of a pulse for turning on a switch operated by the signal. The leading edge of the control signal CS2 may be a rising edge in embodiments where the transistor Sb is an n-channel transistor, or a falling edge in embodiments where the transistor Sb is a p-channel transistor.

The transistors Sa and Sb and the switching controller 300 may each be formed in separate packages, or the transistors Sa and Sb and the switching controller 300 may be formed in a single package.

FIGS. 3-9 illustrate embodiments of a switching controller 300.

Figure 3:
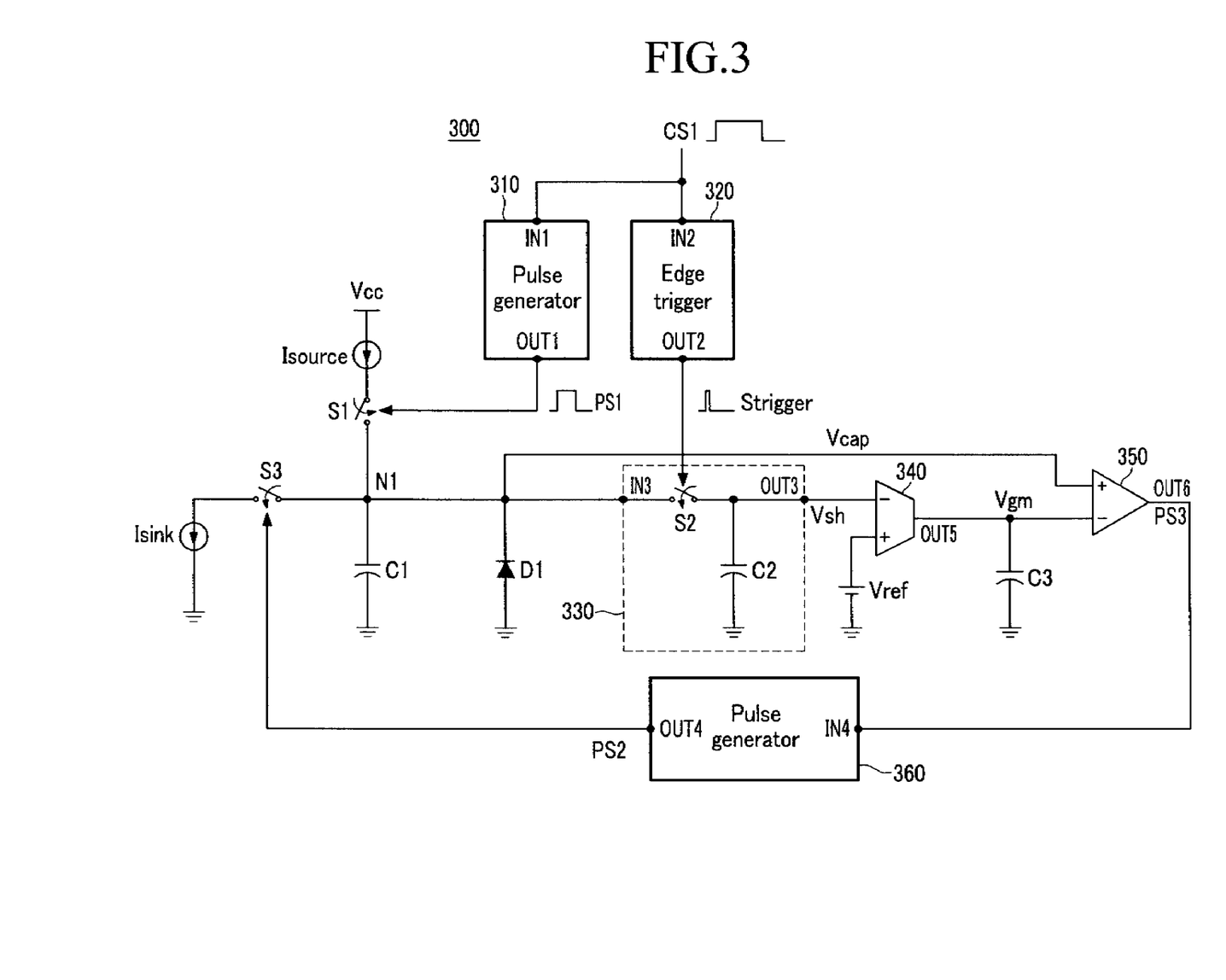
FIG. 3 is a circuit diagram of a switching controller.
Figure 4:
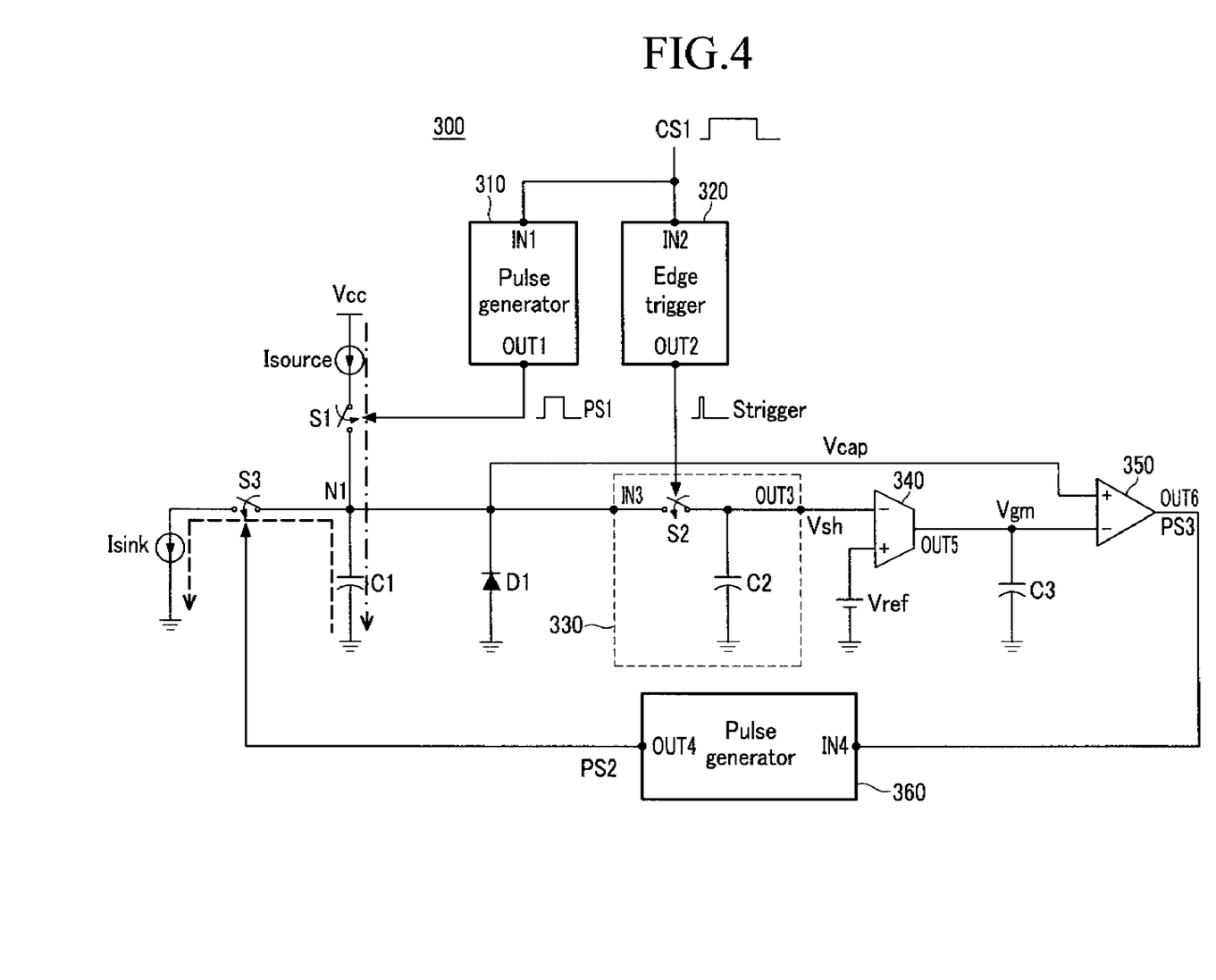
FIG. 4 shows current paths for charging and discharging a capacitor shown in FIG. 3.
Figure 5:
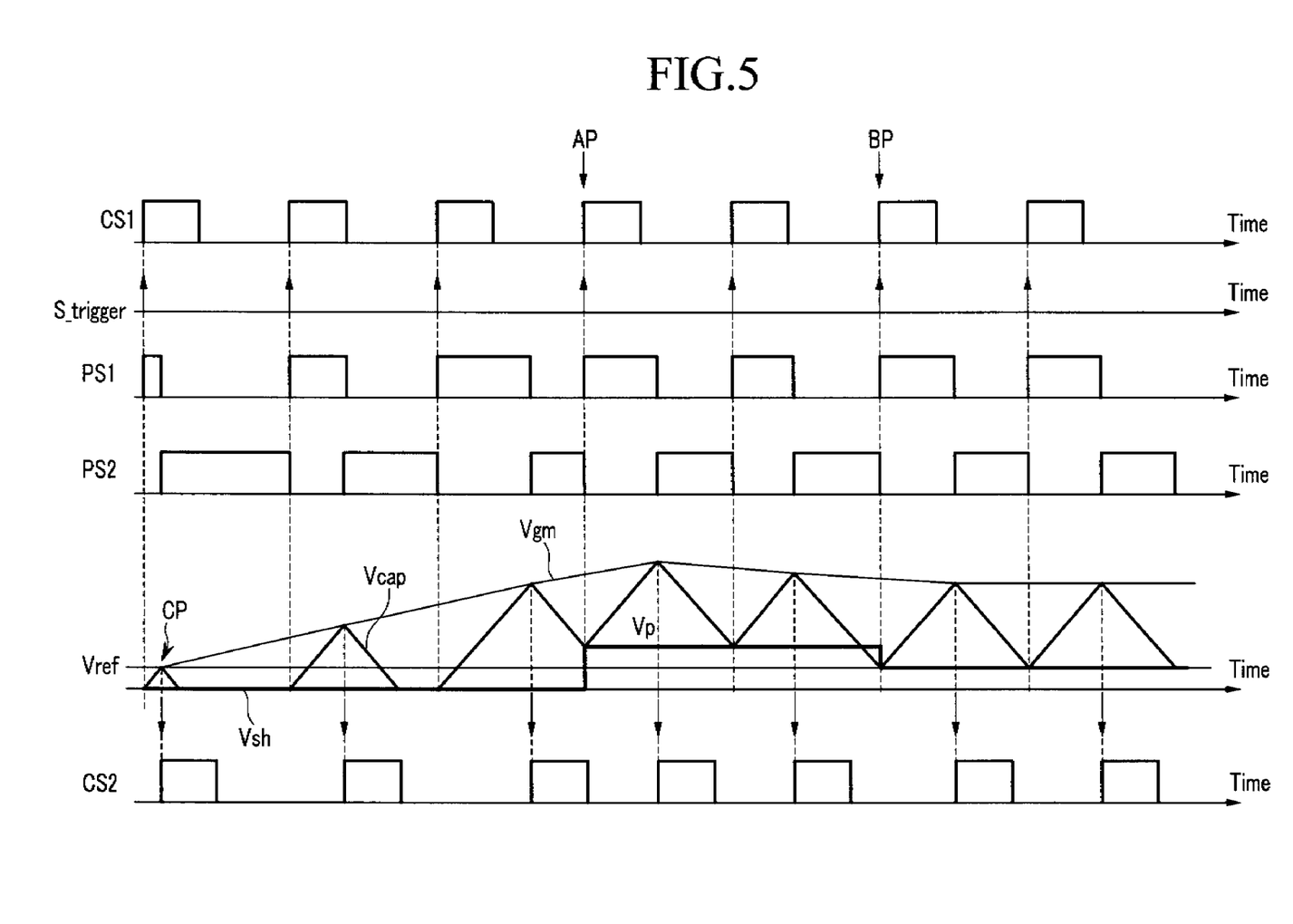
FIG. 5 shows signal waveforms of the switching controller shown in FIG. 3.
Figure 6:
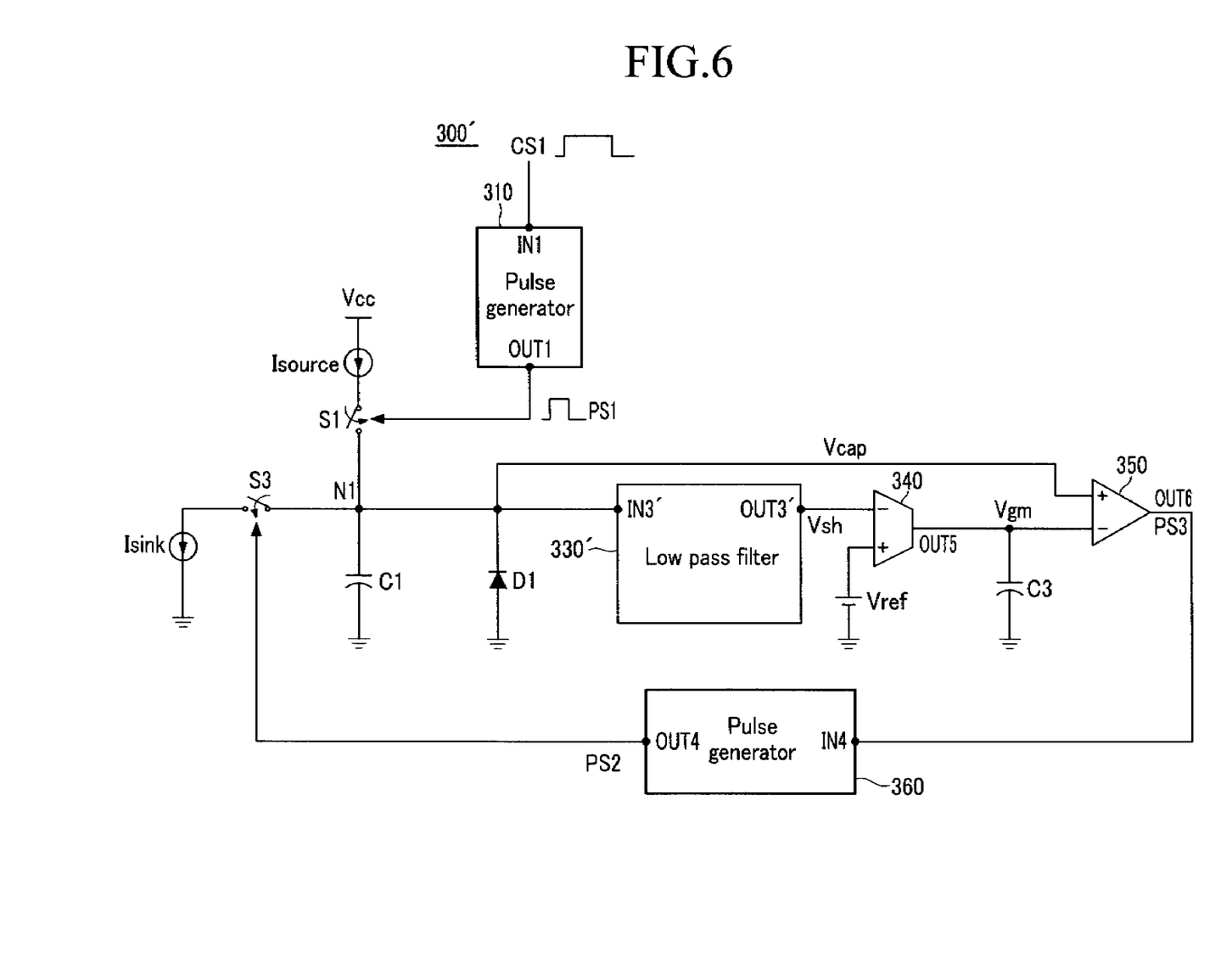
FIG. 6 is a circuit diagram of a switching controller.

FIG. 3 illustrates a circuit diagram of a switching controller, FIG. 4 shows current paths for charging and discharging a capacitor C1 of FIG. 3 and FIG. 5 shows signal waveforms of the switching controller of FIG. 3. FIG. 6 is a circuit diagram of a switching controller.

Referring to FIG. 3, a switching controller 300 may include pulse generators 310 and 360, an edge trigger 320, a sample/holder 330, an amplifier 340, a comparator 350, switches S1, S2, and S3, capacitors C1, C2, and C3, a diode D1, a current source Isource and a current sink Isink.

The pulse generator 310 may include an input terminal receiving the control signal CS1, and an output terminal OUT1 coupled to a control terminal of the switch S1. The pulse generator 310 may detect a leading edge (e.g. a rising edge) of the control signal CS1 to generate a pulse signal PS1, and may output the pulse signal PS1 through the output terminal OUT1. The leading edge of the control signal CS1 may be a falling edge if the transistor Sa is a p-channel transistor.

The edge trigger 320 may include an input terminal IN2 receiving the control signal CS1, and an output terminal OUT2 coupled to a control terminal of the switch S2. The edge trigger 320 can generate a trigger signal Strigger that is triggered at the rising edge of the control signal CS1, and outputs the trigger signal Strigger to the control terminal of the switch S2 through the output terminal OUT2.

The current source Isource may include an input terminal coupled to a power source Vcc and an output terminal. One terminal of the switch S1 can be coupled to the output terminal of the current source Isource, and another terminal of the switch S1 is coupled to a node N1. One terminal of the capacitor C1 can be coupled to the node N1, and another terminal of the capacitor C1 to the ground terminal. A cathode of the diode D1 can be coupled to the node N1, and an anode of the diode D1 to the ground terminal. The current sink Isink may include an input terminal and an output terminal coupled to the ground terminal. The switch S3 can include a control terminal, one terminal coupled to the node N1, and another terminal coupled to the input terminal of the current sink Isink.

The sample/holder 330 may include an input terminal IN3, an output terminal OUT3, a switch S2, and a capacitor C2. The switch S2 may include a control terminal, one terminal coupled to an input terminal IN3, and another terminal coupled to the output terminal OUT3. The capacitor C2 can be coupled between the other terminal of the switch S2 and the ground terminal. The sample/holder 330 may sample a voltage of the capacitor C1 when the switch S2 is turned on by the trigger signal Strigger at the leading edge of the control signal CS1, may hold the sampled voltage Vsh by charging the sampled voltage Vsh to the capacitor C2, and may output the sampled voltage Vsh through the output terminal OUT3.

The amplifier 340 can include an inverting terminal (−) receiving the sampled voltage Vsh from the output terminal OUT3 of the sample/holder 330, a non-inverting terminal (+) receiving a reference voltage Vref, and an output terminal OUT5 coupled to an inverting terminal (−) of the comparator 350. The amplifier 340 can output a current corresponding to a voltage difference between the non-inverting terminal (+) and the inverting terminal (−). In some embodiments it may be a GM error amplifier. The capacitor C3 can be coupled between the output terminal OUT5 and the ground terminal. The capacitor C3 is charged by the current output from the output terminal OUT5 of the amplifier 340. The output voltage Vgm of the amplifier 340 can correspond to the output current of the amplifier 340.

The voltage of the non-inverting terminal (+) of the amplifier 340 is denoted as V+ and the voltage of the inverting terminal (−) of the amplifier 340 is denoted as V−. With this notation the output current Igm can be expressed as:

$$Igm = Gm(V_+ - V_-) \quad (1)$$

Here, Gm is a gain of the amplifier 340. According to Equation 1, when the voltage of the inverting terminal (−) of the amplifier 340 is lower than the voltage of the non-inverting terminal (+) of the amplifier 340, the capacitor C3 is charged. Analogously, when the voltage of the inverting terminal (−) of the amplifier 340 is higher than the voltage of the non-inverting terminal (+) of the amplifier 340, the capacitor C3 is discharged. Accordingly, the voltage of the capacitor C3 is increased at the time of charge and is decreased at the time of discharge, in proportion to the voltage difference between the non-inverting terminal (+) and the inverting terminal (−) of the amplifier 340.

The comparator 350 may include the inverting terminal (−) receiving the output voltage Vgm of the amplifier 340, a non-inverting terminal (+) receiving the voltage Vcap of the capacitor C1, and an output terminal OUT6 coupled to an input terminal IN4 of the pulse generator 360. The comparator 350 may compare a voltage of the non-inverting terminal (+) with a voltage of the inverting terminal (−) to generates a pulse signal PS3, and outputs the pulse signal PS3 to the pulse generator 360 through the output terminal OUT6. When the voltage Vcap of the capacitor C1 input to the non-inverting terminal (+) is higher than the output voltage Vgm of the amplifier 340 input to the inverting terminal (−), the comparator 350 can output the pulse signal PS3 having a high level. When the voltage Vcap of the capacitor C1 input to the non-inverting terminal (+) is lower than the output voltage Vgm of the amplifier 340 input to the inverting terminal (−), the comparator 350 outputs the pulse signal PS3 having a low level.

The pulse generator 360 may include the input terminal IN4 and an output terminal OUT4 coupled to the control terminal of the switch S3. The pulse generator 360 can detect a leading edge (e.g. a rising edge) of the pulse signal PS3 of the comparator 350 input from the input terminal IN4 to generate a pulse signal PS2, and outputs the pulse signal PS2 through the output terminal OUT4. In addition, the switching controller 300 can change the pulse signal PS1 to the low level when the pulse signal PS2 is changed to the high level, and changes the pulse signal PS2 to the low level when the pulse signal PS1 is changed to the high level. Accordingly, the two switches S1 and S3 can be turned on in turn since the two switches S1 and S3 are transistors having the same channel type.

Next, an operation of the switching controller 300 will described with reference to FIG. 4 and FIG. 5. The control signal CS1 can be input to the gate of the transistor Sa by the PWM controller (not shown). Simultaneously, the control signal CS1 can be input to the input terminals IN1 and IN2 of the pulse generator 310 and the edge trigger 320.

When the control signal CS1 having the high level is input to the input terminals IN1 and IN2 of the pulse generator 310 and edge trigger 320, the pulse generator 310 can generate the pulse signal PS1 having the high level at the rising edge of the control signal CS1, and output the pulse signal PS1 to the control terminal of the switch S1.

In addition, the edge trigger 320 may generate the trigger signal Strigger at the rising edge of the control signal CS1, and output the trigger signal Strigger to the control terminal of the switch S2. In some implementations time delays may exist between the rising edge of the control signal CS1 and the rising edge of the signal PS1 and between the rising edge of the control signal CS1 and a rising edge of the trigger signal Strigger.

The pulse signal PS1 having the high level can be input to the control terminal of the switch S1, and the pulse signal PS2 having the low level can be input to the control terminal of the switch S3. As a result, the switch S1 can be turned on, and the switch S3 turned off. With these settings, a current flows through a path including the power source Vcc, the current source Isource, the switch S1, the capacitor C1, and the ground terminal, such that the capacitor C1 is charged.

FIG. 4 shows the charging and discharging current paths of capacitor C1.

FIG. 5 shows the time dependence of the voltage Vcap of the capacitor C1. In the above described time interval Vcap increases.

When the trigger signal Strigger is input to the control terminal of the switch S2, the switch S2 can be turned on. At this time, the sample/holder 330 can sample the voltage Vcap of the capacitor C1 at the rising edge of the control signal CS1 to charge the sampled voltage Vsh to the capacitor C2, and outputs the sampled voltage Vsh to the inverting terminal (−) of the amplifier 340. Since the voltage Vcap of the capacitor C1 is 0V at the rising edge of the control signal CS1, the sampled voltage Vsh is 0V. Accordingly, 0V is input to the inverting terminal (−) of the amplifier 340, and the reference voltage Vref is input to the non-inverting terminal (+) of the amplifier 340. As a result, the amplifier 340 can output a current corresponding to the difference between the reference voltage Vref and 0V. Also, the output voltage Vgm corresponding to the output current of the amplifier 340 can be charged to the capacitor C3. After the switch S2 is turned on during a short time at the rising edge of the control signal CS1 by the trigger signal Strigger, the switch S2 is turned off. The turn-off state of the switch S2 can be maintained until a time before the rising edge of the next control signal CS1.

The comparator 350 can compare the voltage Vcap of the capacitor C1 input to the non-inverting terminal (+) with the output voltage Vgm of the amplifier 340 input to the inverting terminal (−) to generate the pulse signal PS3, and output the pulse signal PS3 to the pulse generator 360. The comparator 350 may output the pulse signal PS3 having the low level when the voltage Vcap of the capacitor C1 is lower than the output voltage Vgm of the amplifier 340, and output the pulse signal PS3 having the high level when the voltage Vcap of the capacitor C1 is higher than the output voltage Vgm of the amplifier 340 by the increase of the voltage Vcap of the capacitor C1.

The pulse generator 360 can generate the pulse signal PS2 having the high level at the rising edge of the pulse signal PS3 output from the comparator 350, and outputs the pulse signal PS2 to the switch S3. In addition, the switching controller 300 sets a rising edge (i.e., a leading edge) of the control signal CS2 for turning on the transistor Sb at the rising edge of the pulse signal PS2. The leading edge of the control signal CS2 may be a falling edge if the transistor Sb is a p-channel transistor. When the pulse signal PS2 having the high level is input to the control terminal of the switch S3, the switch S3 can be turned on. On the other hand, when the pulse signal PS2 having the high level is input to the control terminal of the switch S3, the pulse signal PS1 is changed to the low level such that the switch S1 is turned off. Then, the voltage Vcap of the capacitor C1 is discharged through a path including the capacitor C1, the switch S3, the current sink Isink, and the ground terminal as shown in FIG. 4. As a result, the voltage Vcap of the capacitor C1 can gradually decrease to 0V.

Next, the control signal CS1 having the high level is input to the gate of the transistor Sa again after one switching cycle of the transistor Sa. Then, the switching controller 300 performs the above operation, and the above operation is repeated. Since the sampled voltage Vsh of the sample/holder 330 is 0V if the voltage of capacitor C1 is discharged to 0V when the above operation is repeated, the output voltage Vgm of the amplifier 340 is continuously increased. A time taken for the voltage Vcap of the capacitor C1 to reach the output voltage Vgm from 0V lengthens as the output voltage Vgm is continuously increased. Accordingly, a time between the rising edge of the control signal CS1 and the rising edge of the pulse signal PS2 lengthens.

As the time between the rising edge of the control signal CS1 and the rising edge of the pulse signal PS2 lengthens, the control signal CS1 having the high level can be input to the input terminals IN1 and IN2 of the pulse generator 310 and the edge trigger 320 before the voltage Vcap of the capacitor C1 is decreased to 0V, illustrated as a time AP shown in FIG. 5. At this time, the switch S2 can be turned on by the control signal CS1 such that the sample/holder 330 samples the voltage Vcap of the capacitor C1 at the rising edge of the control signal CS1, and outputs the sampled voltage Vsh to the inverting terminal (−) of the amplifier 340. Here, the sampled voltage Vsh can be the voltage Vp, which is the voltage Vcap of the capacitor C1 at the point A. Since the amplifier 340 outputs a negative current when the voltage Vp is higher than the reference voltage Vref, the output voltage Vgm of the amplifier 340 is decreased. The output voltage Vgm of the amplifier 340 may be decreased after a time delay from the time AP because of a response time of the amplifier 340. As the output voltage Vgm of the amplifier 340 is decreased, the time between the rising edge of the control signal CS1 and the rising edge of the pulse signal PS2 shortens.

Accordingly, by repeating the above operation, the switching controller 300 can detect a time BP at which the sampled voltage Vsh of the sample/holder 330 is the same as the reference voltage Vref.

When the sampled voltage Vsh of the sample/holder 330 is the same as the reference voltage Vref, the output voltage Vgm of the amplifier 340 can become constant. Accordingly, a time for charging the capacitor C1 becomes the same as a time for discharging the capacitor C1. As a result, the switching controller 300 can generate the control signal CS2 having the phase shift of 180 degrees on the control signal CS1.

FIG. 6 illustrates that a switching controller 300' may include a low pass filter 330' instead of the edge trigger 320 and the sample/holder 330 shown in FIG. 3. The low pass filter 330' may include an input terminal IN3' receiving the voltage Vcap of the capacitor and an output terminal OUT3' coupled to the inverting terminal (−) of the amplifier 340. The low pass filter 330' can filter the voltage Vcap of the capacitor C1 forming a triangle wave to calculate an average value of the voltage Vcap of the capacitor C1, and output the average value through the output terminal OUT3'. Accordingly, the filtered voltage is increased as the voltage Vcap of the capacitor C1 at the rising edge of the control signal CS1 is increased. The amplifier 340 can output a current corresponding to the difference between the reference voltage Vref and the average value output from the low pass filter 330'.

Figure 7:
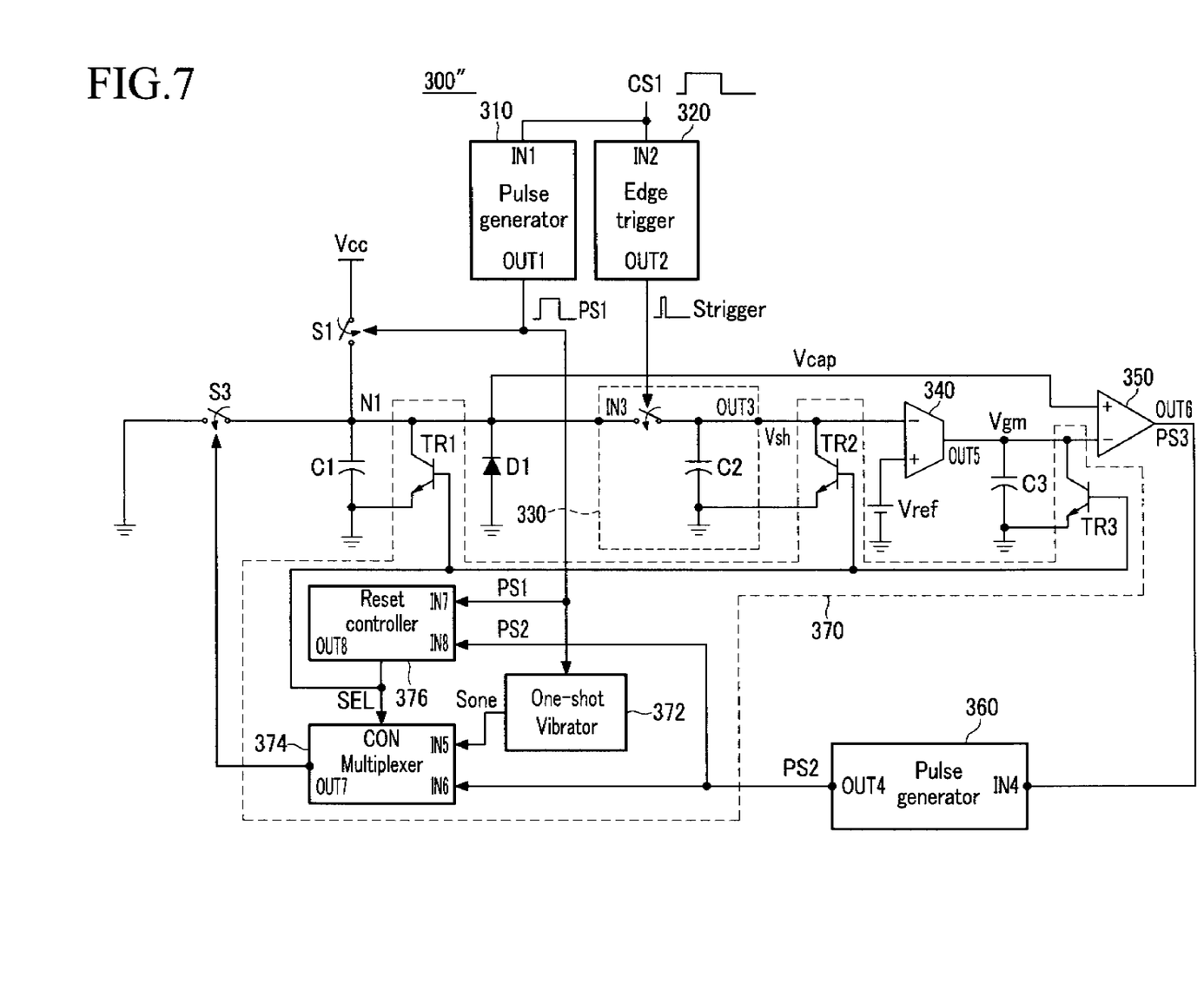
FIG. 7 is a circuit diagram of a switching controller.
Figure 8:
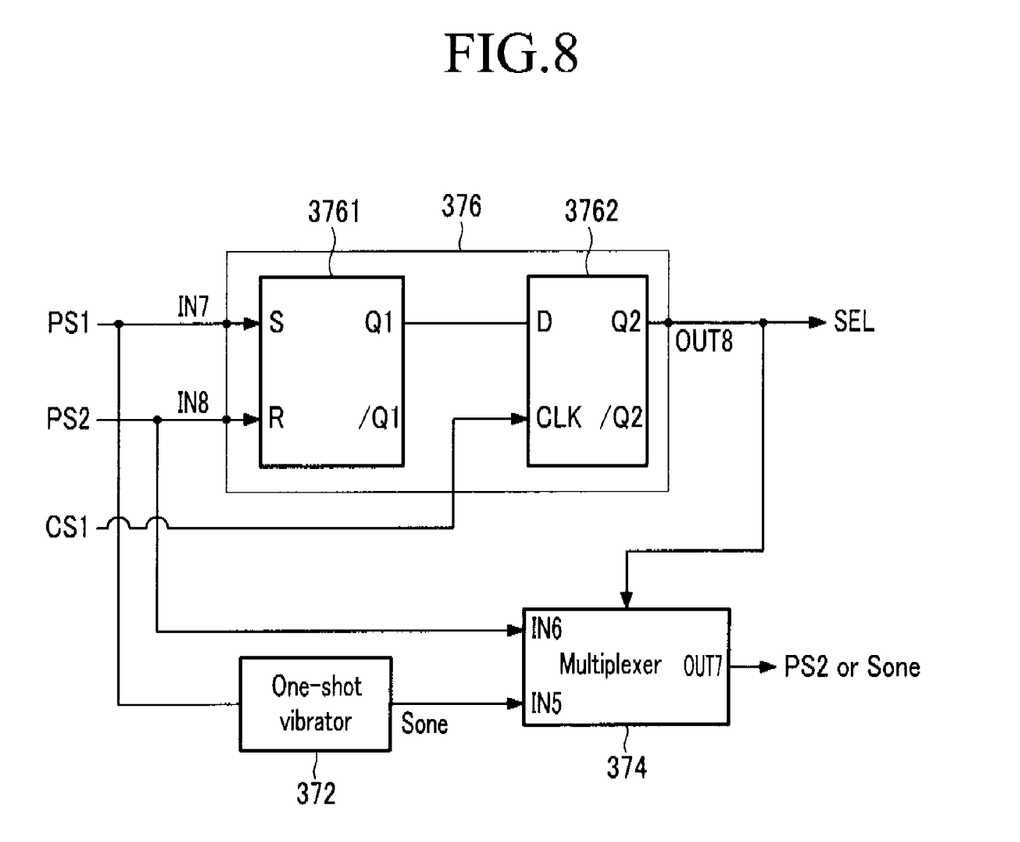
FIG. 8 is a circuit diagram of one example of a reset circuit shown in FIG. 7.
Figure 9:
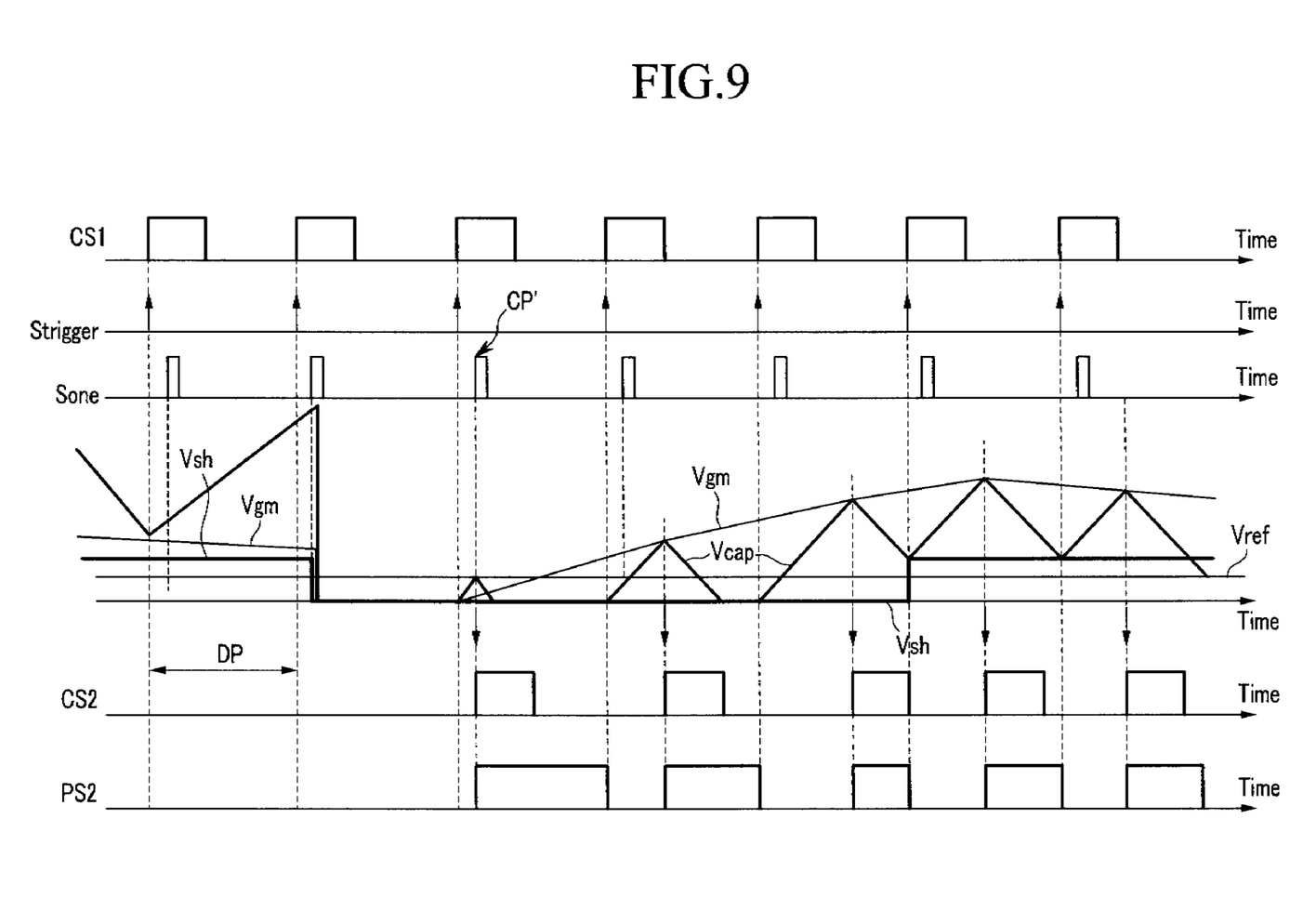
FIG. 9 shows signal waveforms of the switching controller.

FIG. 7 is a circuit diagram of a switching controller, FIG. 8 is a circuit diagram of one example of a reset circuit shown in FIG. 7, and FIG. 9 shows signal waveforms of the switching controller.

Referring FIG. 7, a switching controller 300'' may further include a reset circuit 370 compared with the switching controller 300 shown in FIG. 3.

The reset circuit 370 may include transistors TR1, TR2, and TR3, a one-shot vibrator 372, a multiplexer 374, and a reset controller 376. The transistors TR1 to TR3 can be n-channel bipolar junction transistors (BJTs). Alternatively, other switches may be used instead of the BJTs.

The multiplexer 374 can include two input terminals IN5 and IN6, an output terminal OUT7, and a control terminal CON. The reset controller 376 can include two input terminals IN7 and IN8, and an output terminal OUT8. The transistors TR1, TR2, and TR3 are respectively coupled to the capacitors C1, C2, and C3 in parallel, and bases of the transistors TR1, TR2, and TR3 are coupled to the output terminal OUT8 of the reset controller 376. The transistors TR1, TR2, and TR3 are turned on/off by a control of the reset controller 376, and the capacitors C1, C2, and C3 are reset by turn-on of the transistors TR1, TR2, and TR3, respectively.

The one-shot vibrator 372 can detect the rising edge of the pulse signal PS1, and generate a pulse signal Sone that has the high level during a short time after a predetermined delay time from the rising edge of the pulse signal PS1. The pulse signal Sone is a start signal for generating the control signal CS2 having the phase shift of 180 degrees from the control signal CS1.

The reset controller 376 may receive the pulse signals PS1 and PS2 through the input terminals IN7 and IN8, respectively. The reset controller 376 generates a control signal SEL for controlling on/off of the transistors TR1, TR2, and TR3, and multiplexer 374 in accordance with the pulse signals PS1 and PS2, and outputs the control signal SEL through the output terminal OUT8. Particularly, the reset controller 376 can determine an error state unless receiving the pulse signal PS2 having the high level within one switching cycle of the control signal PS1, and turn on the transistors TR1, TR2, and TR3 to reset the capacitors C1, C2, and C3.

The multiplexer 374 may receive the pulse signals Sone and PS2 through the input terminals IN5 and IN6, respectively. The multiplexer 374 selects any one of the pulse signal Sone and the pulse signal PS2 in accordance with the control signal SEL input to the control terminal, and outputs the selected pulse signal to the control terminal of the switch S3 through the output terminal OUT7.

Referring to FIG. 8, the reset controller 376 further includes an SR latch 3761 and a D flipflop 3762.

The SR latch 3761, for example the SR latch using NOR gate, can include a set terminal S, a reset terminal R, an output terminal Q1, and an inverting output terminal/Q1, and the set terminal S and the reset terminal R are coupled to the input terminals IN7 and IN8, respectively.

The D flipflop 3762 can include an input terminal D, a clock terminal CLK, an output terminal Q2, and an inverting output terminal/Q2. For example, the D flipflop 3762 can output information of the input terminal D when a voltage of the clock terminal CLK is the high level, and maintains the previous information when the voltage of the clock terminal CLK is the low level. The input terminal D is coupled to the output terminal Q1 of the SR latch 3761, the output terminal Q2 is coupled to the output terminal OUT8, and the clock terminal CLK receives the control signal CS1.

Next, an operation of the reset circuit 370 will be described with reference to FIG. 5, FIG. 8, and FIG. 9.

When the pulse signal PS1 having the high level generated from the control signal CS1 at the first cycle is input to the set terminal S of the SR latch 3761, and the pulse signal PS2 having the low level is input to the reset terminal R of the SR latch 3761, the SR latch 3761 can be set to output a high level signal to the output terminal Q1. In addition, the SR latch 3761 may maintain the output terminal Q1 at the high level signal unless the pulse signal PS2 is changed to the high level. The high level signal of SR latch 3761 may be input to the input terminal D of the D flipflop 3762. Accordingly, the D flipflop 3762 can output the selection signal SEL having the high level to the output terminal Q2 when the control signal CS1 has the high level at the next cycle and the pulse signal PS2 is not changed to the high level before the next cycle. The multiplexer 374 may output the pulse signal Sone input from the input terminal IN5 in response to the high level of the selection signal SEL.

When the pulse signal PS1 having the low level generated from the control signal CS1 at the first cycle is input to the set terminal S of the SR latch 3761, and the pulse signal PS2 having the high level is input to the reset terminal R of the SR latch 3761, the SR latch 3761 can output a low level signal to the output terminal Q1. The low level signal of SR latch 3761 can be input to the input terminal D of the D flipflop 3762. Accordingly, the D flipflop 3762 can output the selection signal SEL having the low level to the output terminal Q2 when the control signal CS1 has the high level at the next cycle. The multiplexer 374 can output the pulse signal PS2 input from the input terminal IN6 in response to the low level of the selection signal SEL.

On the other hand, the D flipflop 3762 may be set to output the selection signal SEL having the high level to the output terminal Q2 at the first cycle. Accordingly, when the switching controller 300 is normally operated, the D flipflop 3762 outputs the selection signal SEL having the high level once at a point CP shown in FIG. 5. Since the pulse signal PS1 is changed to the low level and the pulse signal PS2 is changed to the high level at the end of all cycles, the D flipflop 3762 outputs the selection signal SEL having the low level from the second cycle.

However, as shown in relation to a period DP in FIG. 9, the pulse signal PS2 may not be changed to the high level within one switching cycle by an abnormal operation of the switching controller. Then, the capacitor C1 may not be discharged in the switching controllers 300 and 300' shown in FIG. 3 and FIG. 6 such that the voltage Vcap of the capacitor C1 may be continuously increased. In the switching controller 300", the D flipflop 3762 outputs the selection signal SEL having the high level to the output terminal Q2 when the control signal CS1 has the high level at the next cycle. Accordingly, the multiplexer outputs the pulse signal Sone having the high level, and the transistors TR1, TR2, and TR3 are turned on in response to the high level of the pulse signal Sone such that the capacitors C1, C2, and C3 are reset. As a result, the voltages of the capacitors C1, C2, and C3 are decreased to 0V.

FIG. 9 illustrates that the D flipflop 3762 may output the selection signal SEL having the high level once at a point CP' after the capacitors C1, C2, and C3 are reset.

As described above, according to the exemplary embodiments, in the interleaved switching converter including the plurality of converters coupled in parallel, a control signal can be applied to the switch of each converter with an accurate phase shift.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A switching controller of an interleaved switching converter comprising a first converter and a second converter coupled in parallel, the first converter using a first switch operated by a first control signal and the second converter using a second switch operated by a second control signal, the switching controller comprising:
    a third switch coupled between a first voltage source and a node, configured to turn on in response to a first pulse signal corresponding to the first control signal;
    a capacitor coupled to the node;
    an amplifier configured to output a current corresponding to a difference between a reference voltage and a voltage corresponding to a voltage of the capacitor;
    a comparator configured to compare an output voltage corresponding to the current output from the amplifier with the voltage of the capacitor, and to output a second pulse signal according to the comparison; and
    a fourth switch coupled between the node and a second voltage source, configured to turn on in response to a third pulse signal, the third pulse signal being generated by the second pulse signal and determining a leading edge of the second control signal.

2. The switching controller of claim 1, wherein the capacitor is charged when the third switch is turned on, and the capacitor is discharged when the fourth switch is turned on.

3. The switching controller of claim 2, further comprising:
    a first current source coupled between the first voltage source and the third switch; and
    a second current source coupled between the second voltage source and the fourth switch.

4. The switching controller of claim 2, wherein the voltage corresponding to the voltage of the capacitor increases as the voltage of the capacitor at a turn-on time of the third switch increases.

5. The switching controller of claim 2, further comprising a sample/holder configured to sample the voltage of the capacitor at a turn-on time of the third switch, and to output the sampled voltage as the voltage corresponding to the voltage of the capacitor.

6. The switching controller of claim 2, further comprising a low pass filter configured to filter the voltage of the capacitor, and to output the filtered voltage as the voltage corresponding to the voltage of the capacitor.

7. The switching controller of claim 2, further comprising a reset circuit configured to reset the capacitor when the leading edge of the second control signal does not exist during one switching cycle of the first control signal.

8. The switching controller of claim 7, wherein the reset circuit comprises:
- a fifth switch coupled to the capacitor in parallel; and
- a reset controller configured to generate a selection signal based on the first pulse signal and the third pulse signal, and to determine an on/off state of the fifth switch in accordance with the selection signal.

9. The switching controller of claim 7, wherein the reset circuit comprises:
- a one-shot vibrator configured to generate a start signal based on the first pulse signal; and
- a multiplexer configured to select one of the start signal and the third pulse signal, and to output the selected signal to the fourth switch.

10. The switching controller of claim 9, wherein the reset controller further comprises:
- an SR latch configured to receive the first pulse signal and the third pulse signal; and
- a D flipflop that includes an input terminal receiving an output of the SR latch, a clock terminal receiving the first control signal, and an output terminal outputting the selection signal.

11. The switching controller of claim 2, further comprising:
- a first pulse generator configured to generate the first pulse signal based on the first control signal, and
- a second pulse generator configured to generate the third pulse signal based on the second pulse signal.

12. The switching controller of claim 11, wherein
- the first pulse generator is configured to detect a leading edge of the first control signal and to generate the first pulse signal in accordance with the leading edge of the first control signal, and
- the second pulse generator configured to detect a leading edge of the second pulse signal and to generate the third pulse signal in accordance with the leading edge of the second pulse signal.

13. An interleaved switching converter comprising:
- a first converter configured to include a first switch operated in response to a first control signal, and to generate a first output voltage corresponding to an input voltage by using the first switch;
- a second converter coupled to the first converter in parallel, that includes a second switch operated in response to a second control signal, the second converter configured to generate a second output voltage corresponding to the input voltage by using the second switch; and
- a switching controller configured to determine a leading edge of the second control signal based on the first control signal,
- wherein the switching controller comprises:
- a capacitor that is charged in response to a first pulse signal corresponding to the first control signal and is discharged in response to a second pulse signal,
- an amplifier configured to output a current corresponding to a difference between a reference voltage and a voltage corresponding to a voltage of the capacitor,
- a comparator configured to compare an output voltage corresponding to the current output from the amplifier with the voltage of the capacitor, and to output a third pulse signal according to the comparison, and
- a pulse generator configured to determine a leading edge of the second pulse signal based on the third pulse signal, the leading edge of the second control signal being determined by the leading edge of the second pulse signal.

14. The interleaved switching converter of claim 13, wherein the pulse generator is configured to detect a leading edge of the third pulse signal, and to determine the leading edge of the second pulse signal in accordance with the leading edge of the third pulse signal.

15. The switching controller of claim 13, wherein the voltage corresponding to the voltage of the capacitor increases as the voltage of the capacitor at a turn-on time of the third switch increases.

16. The interleaved switching converter of claim 13, further comprising a reset circuit configured to detect an error of the switching controller based on the first pulse signal and the second pulse signal, and to reset the capacitor in accordance with the error.

17. The interleaved switching converter of claim 13, wherein a phase shift between the first control signal and the second control signal is 180 degrees.

18. The interleaved switching converter of claim 13, wherein each of the first switch, the second switch, and the switching controller is formed in separate packages.

19. The interleaved switching converter of claim 13, wherein the first switch, the second switch, and the switching controller are formed in a single package.

20. A method of controlling an interleaved switching converter including a first converter and a second converter coupled to the first converter in parallel, the first converter including a first switch operated by a first control signal, and the second converter including a second switch operated by a second control signal, the method comprising:
- generating a first pulse signal in accordance with a leading edge of the first control signal;
- charging a capacitor in response to the first pulse signal;
- generating a second pulse signal based on a voltage of the capacitor;
- generating a third pulse signal in accordance with a leading edge of the second pulse signal;
- discharging the capacitor in response to the third pulse signal; and
- determining a leading edge of the second control signal in accordance with a leading edge of the third pulse signal.

21. The method of claim 20, wherein the generation of the second pulse signal comprises:
- outputting a current corresponding to a difference between a reference voltage and a voltage at a charging time of the capacitor; and
- generating the third pulse signal by comparing a voltage corresponding to the current with the voltage of the capacitor.

22. The method of claim 20, further comprising resetting the capacitor when the leading edge the third pulse signal is not generated during a switching cycle of the first pulse signal.

* * * * *